United States Patent
Holtz et al.

(10) Patent No.: US 7,165,248 B2
(45) Date of Patent: Jan. 16, 2007

(54) FILE TREE CONFLICT PROCESSOR

(75) Inventors: Brian Holtz, San Carlos, CA (US);
Vijay Balasubramanian, San Jose, CA (US); Nidheesh Dubey, Fremont, CA (US); Aseem Sharma, Sunnyvale, CA (US); Vivek Pandey, Fremont, CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 771 days.

(21) Appl. No.: 10/023,378

(22) Filed: Dec. 12, 2001

(65) Prior Publication Data

US 2004/0015456 A1    Jan. 22, 2004

Related U.S. Application Data

(60) Provisional application No. 60/295,900, filed on Jun. 4, 2001, provisional application No. 60/295,987, filed on Jun. 4, 2001.

(51) Int. Cl.
*G06F 9/44* (2006.01)
*G06F 7/00* (2006.01)

(52) U.S. Cl. .............. 717/170; 707/1; 707/8
(58) Field of Classification Search ............. 707/8, 707/1, 202
See application file for complete search history.

(56) References Cited

U.S. PATENT DOCUMENTS

| 4,558,413 | A | | 12/1985 | Schmidt et al. |
| 5,588,147 | A | * | 12/1996 | Neeman et al. ............... 707/1 |
| 5,600,834 | A | | 2/1997 | Howard |
| 5,778,389 | A | | 7/1998 | Pruett et al. |
| 5,787,262 | A | | 7/1998 | Shakib et al. |
| 6,098,078 | A | | 8/2000 | Gehani et al. |
| 6,240,414 | B1 | * | 5/2001 | Beizer et al. ............... 707/8 |
| 6,243,705 | B1 | | 6/2001 | Kucala |
| 6,343,299 | B1 | | 1/2002 | Huang et al. |

FOREIGN PATENT DOCUMENTS

| EP | 0 684 558 A1 | 11/1995 |
| EP | 0 097 125 A | 4/1999 |

OTHER PUBLICATIONS

"SUN Work Shop TeamWare: Users Guide",http://docs-pdf.sun.com/802-5953/802-5953.pdf, Revision A, Dec. 1996, pp. 1, 25, 48-56, and 66.*
"UNISON", File Synchronizer, http://web.archive.org/web/20001109014500/http://www.cis.upenn.edu/~bcpierce/unison/, Sep. 2000, p. 1.*

(Continued)

*Primary Examiner*—Wei Zhen
*Assistant Examiner*—Chih-Ching Chow
(74) *Attorney, Agent, or Firm*—Sonnenschein Nath & Rosenthal LLP

(57) ABSTRACT

The embodiments of the present invention provide a method for resolving conflicting changes encountered when reconciling parallel user changes to two synchronized trees of folders and files. According to one embodiment, these conflicts are presented to the user as an interface that requires an indication from the user to the winner of the conflict. According to another embodiment, since certain conflicts cannot be resolved independently, they have to be combined and presented to the user as a single conflict. According to yet another embodiment, after the user has indicated which operations are the winners of all or some of the conflicts, the winning operations are applied to the file tree with which they are in conflict.

9 Claims, 12 Drawing Sheets

OTHER PUBLICATIONS

Prabhu Ram and Lyman Do, "Extracting Delta for Incremental Data Warehouse Maintenance", Jun. 200, pp. 220-229, Phantom Works Mathematics and Computing Technology, Seattle, Washington.

Sudarshan S. Chawathe and Hector Garcia-Molina, "Meaningful Change Detection in Structured Data," Proceedings of the 1997 ACM SIGMOD International Conference on Management of Data, 1997, pp. 26-37, XP-002228386.

Jason T. L. Wang, et al., "A Tool for Tree Pattern Matching," Proceedings of the International Conference on Tools for Artificial Intelligence, San Jose, CA, Nov. 5-8, 1991, pp. 436-444, XP-010025519.

S. Balasubramaniam and Benjamin C. Pierce, "What is a File Synchronizer?" MOBICOM '98. Proceedings of the 4th Annual ACM/IEEE International Conference on Mobile Computing and Networking, Dallas, TX, Oct. 25-30, 1998, pp. 98-108, XP-000850260.

* cited by examiner

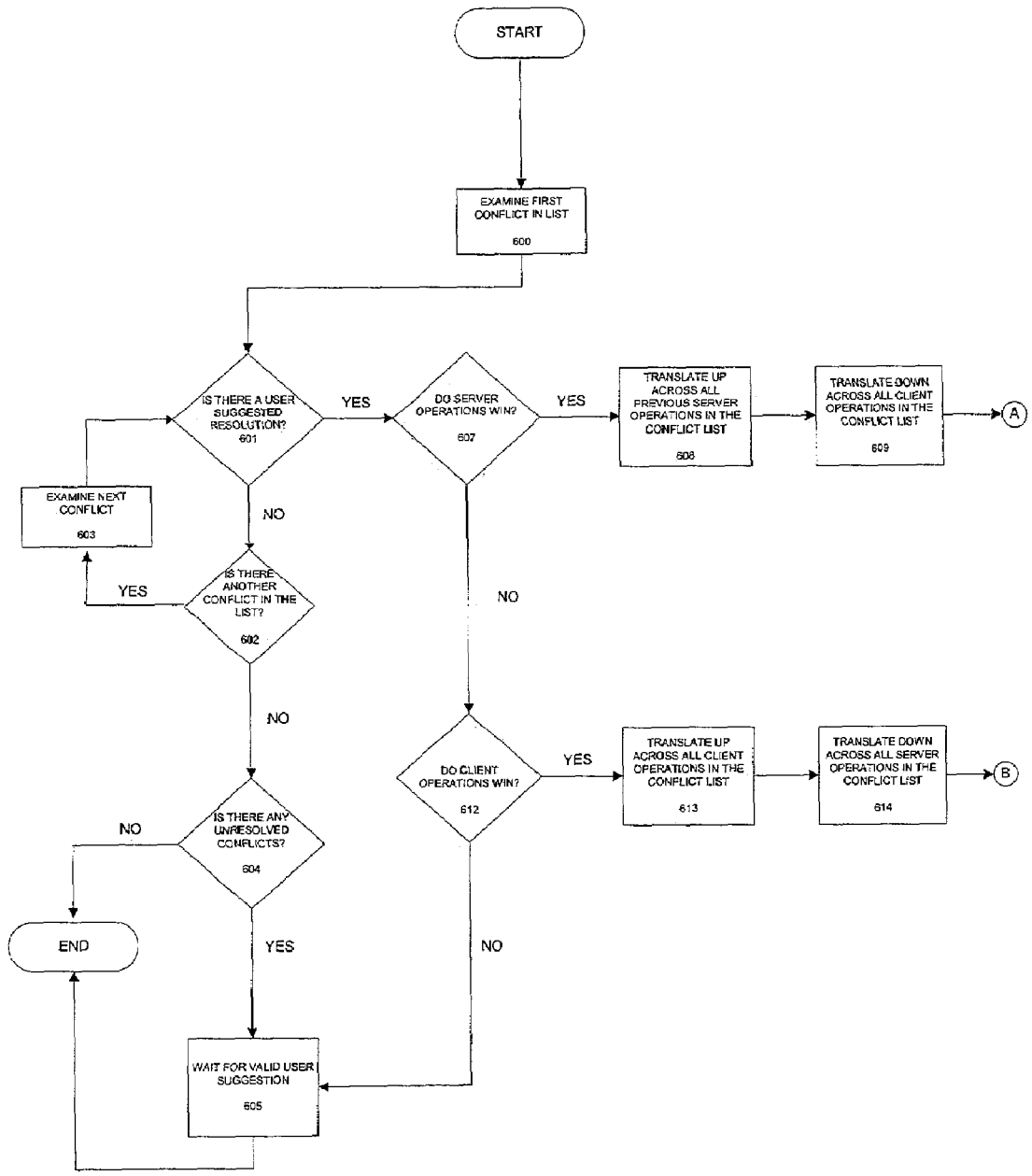

PAGE 2

FILE TREE CONFLICT PROCESSOR

RELATED APPLICATION

This application claims the benefit of co-pending U.S. Provisional Patent Application No. 60/295,900 filed Jun. 4, 2001, co-pending U.S. Non-Provisional patent application Ser. No. 10/021,943 filed on Dec. 12, 2001, co-pending U.S. Provisional Patent Application No. 60/295,987 filed on Jun. 4, 2001, and co-pending U.S. Non-Provisional patent application Ser. No. 10/021,854 filed on Dec. 12, 2001, and claiming priority to the above mentioned Non-Provisional Applications the disclosures of which are hereby incorporated by references.

BACKGROUND OF THE INVENTION

1. Field of the Invention

The present invention relates to file systems, and in particular to a method for resolving a conflict between parallel user changes to two synchronized trees of folders and files.

Portions of the disclosure of this patent document contain material that is subject to copyright protection. The copyright owner has no objection to the facsimile reproduction by anyone of the patent document or the patent disclosure as it appears in the Patent and Trademark Office file or records, but otherwise reserves all rights whatsoever.

2. Background Art

A way to organize files and folders of a user on a computer is by arranging them in a structure commonly known as a tree. Oftentimes, files and folders are changed. When this happens, a new tree is generated. It is helpful sometimes to find and reconcile differences between the old and new trees. Reconciling differences could lead to conflict in changes that require indication as to which conflicting takes precedence. Resolving these conflicting changes currently is very difficult, as will be further explained below. Before discussing this problem, an overview of a tree data structure is provided.

Tree Data Structure

A tree data structure is illustrated in FIG. 1. The apex 100 of the tree is commonly called the root. The root is usually a folder that contains all other sub-folders and files of a user. The root is the starting location of all folders and files of a computer user from where links spread out like branches of a tree to other sub-folders and files.

The nodes of the tree (i.e., the actual files) are denoted by parent, child, leaf, and non-leaf locations or nodes. A parent is any node that has a branch leading down to one or more lower nodes. In FIG. 1, root 100 is one example of a parent. A child is any node that has a branch leading up to a higher node. Referring back to FIG. 1, all nodes except the root is a child node. This child node category can be further segregated into left and right child depending upon the location of the child node with respect to its parent. Node 101 is a right child node, while node 102 is a left child node of parent node 103. A leaf node is any node that does not have any branches leading to lower levels in the tree. All nodes at the bottom most level of the tree (for example, 104, 105, and 106) are leaf nodes. In contrast, all other nodes are categorized as non-leaf nodes as they have a child node under them (for example, 100).

Tree Modification

When a user makes changes to the folders and files, for instance by deleting or adding a file or changing its contents, these changes have to be correctly incorporated into the tree. Typically, a new tree is generated every time a change is made. This new tree is then compared to the old tree, and all necessary changes are reconciled to create one updated tree. Reconciling differences could lead to conflict in changes that require indication as to which conflicting change should win. This requires that the old state has to be remembered and compared with the new state in order to resolve any conflicting changes, which is wasteful of resources.

File Tree Conflict Processor

In order to resolve any conflicting changes between and old and a new file tree, the two trees have to be compared. A utility, commonly called a file tree comparator, compares the two file tree descriptions and generates a sequenced log of changes that transforms the old tree to a new tree. A complete description of one file tree comparator is contained in co-pending provisional U.S. patent application "File Tree Comparator", Ser. No. 60/296,065 filed on Jun. 4, 2001, and co-pending non-provisional U.S. patent application "File Tree Comparator", Ser. No. 10/021,943 filed on Dec. 12, 2001, and assigned to the assignee of this patent.

After the changes have been recorded, another utility, commonly known as a reconciler, takes in as its input the log of changes (if one is available) from both the old and the new file trees and reconciles any changes that have occurred since the last synchronization. A complete description of one file tree reconciler is contained in co-pending U.S. patent application "File Tree Change Reconciler", Ser. No. 60/295,987 filed on Jun. 4, 2001, and co-pending U.S. patent application "File Tree Change Reconciler", Ser. No. 10/021,854 filed on Dec. 12, 2001, and assigned to the assignee of this patent application.

When reconciling parallel user changes to two synchronized trees of folders and files, conflicting changes may be encountered that require indication as to which conflicting change takes precedence. These conflicting changes are handled by another utility commonly called a conflict processor. Some conflicting changes cannot be resolved independently, and those entangled conflicts have to be combined into one to be presented to the user as a single conflict. After the user indicates the winner of the conflict, the winning operations need to be applied to the file tree with which they are in conflict.

There are several commercially available conflict processors that find conflicting changes in two file tree structures. One file tree conflict processor is called Xfiles. Xfiles allows comparing, reconciling any changes, reconciling any conflicting changes, and merging two file trees over a network. In operation, Xfiles compares and merges the two file tree versions using a client/server program (graphical user interface on the client) that traverses the file trees and reports any files that are missing on the server or client machines, are different, or are conflicting with each other.

The main drawback with Xfiles is that the entire tree has to be traversed in order to find any conflicting changes to be reported to the user. Many trees are very large, in which case a substantial amount of time may be wasted traversing large portions of the tree that are not modified. Moreover, if the network connection is slow, or network traffic high, Xfiles becomes prohibitively wasteful of resources. A second drawback associated with Xfiles is that those conflicting changes have to be manually removed by the user. This compels the user to have a thorough knowledge of the entire file tree, and of all the changes made to it.

Another file tree conflict processor, termed Teamware, includes methods for finding differences in file trees, with the assumption that the file trees are of a special type—containing only SCCS folders and files—that are directly annotative. Using Teamware, developers may each be assigned a separate sub-directory of a single root directory designated as the parent workspace for a current project. The parent workspace contains the original copies of each project file and records of each set of changes to each file.

The developers obtain copies of project files for reading and editing purposes within their individual workspaces, and to record any modifications they make in the central location later on. A locking mechanism in SCCS prevents two developers from checking out the same file for editing at the same time. There are several drawbacks with Teamware, which include detecting file tree conflicting changes based on modification times rather than on change logs. Teamware is restricted further because it only works on SCCS folders and files, so, it has no application to most file tree systems.

Another file tree conflict processor is called Unison. Unison is a file synchronization tool for Unix and Windows operating systems. It allows two replicas of a collection of files, folders, or directories to be stored on different hosts or different disks on the same host, modified separately, and then brought up to date by propagating the changes in each replica to the other. Unison sends from one side (server or client) to the other the entire log, and makes the receiving side responsible for finding any conflicting changes in the files, folders, and directories of both sides. This system works well only because the utility has an indefinitely growing version log for each synced file, which is pruned only when all known synchronizers have seen the pruned versions. There is a time limit (usually a month) when the utility abandons files that have not been synced in order to prune the size of the log.

There are several drawbacks with this utility. A log for the entire file tree is sent across. If the file tree is large, the time involved in transmitting the log for the entire file tree can be time consuming, especially if the network connection is slow, or the network is highly congested. Moreover, a file not in use beyond the time limit is automatically abandoned by the log. If a user attempts to make certain changes to it, they may not be reflected in the log that is sent across to the other side. If these changes conflict, the user will be unaware of this causing synchronization problems. Furthermore, the conflict processor utility simply gives a list of all conflicts to the user, who has to manually resolve all conflicts. This compels the user to have a thorough knowledge of the entire file tree, and of all the changes made to it. This makes use of the tool difficult and unyielding.

SUMMARY OF THE INVENTION

The embodiments of the present invention provide a method for resolving conflicting changes encountered when reconciling parallel user changes to two synchronized trees of folders and files. According to one embodiment each synchronized tree of folders and files may reside on a client and server respectively. According to one embodiment, these conflicts require user indication as to which conflict takes precedent. According to one embodiment, these conflicts are presented to the user as an interface.

According to another embodiment, since certain conflicts cannot be resolved independently, they are combined into one, and presented to the user as a single conflict. According to yet another embodiment, after the user has indicated which operations are the winners of all or some of the conflicts, the winning operations are applied to the file tree with which they are in conflict. This file tree can be on either the client or the server.

BRIEF DESCRIPTION OF THE DRAWINGS

These and other features, aspects and advantages of the present invention will become better understood with regard to the following description, appended claims and accompanying drawings where:

DETAILED DESCRIPTION OF THE INVENTION

The embodiments of the present invention are a file tree conflict processor. In the following description, numerous specific details are set forth to provide a more thorough description of embodiments of the invention. It will be apparent, however, to one skilled in the art, that the embodiments of the present invention may be practiced without these specific details. In other instances, well known features have not been described in detail so as not to obscure the invention.

File Tree Conflict Processor

Figure 1:
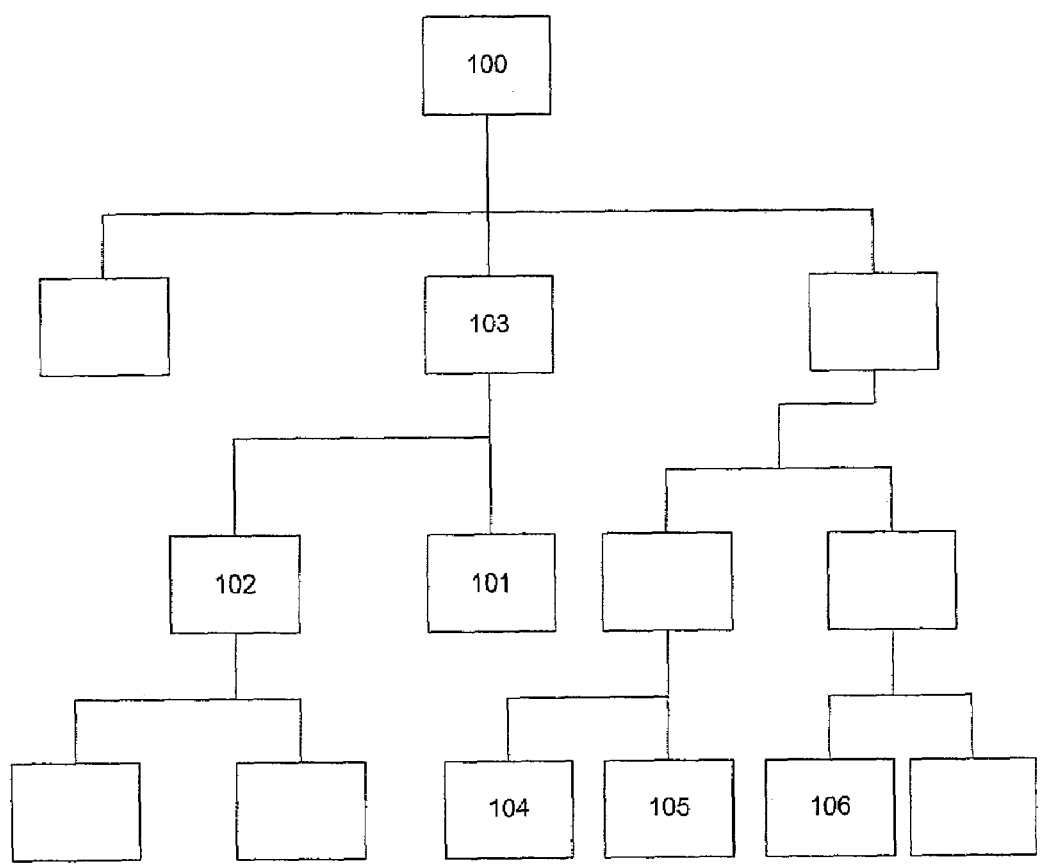
FIG. 1 is an illustration of a file tree structure.
Figure 2:
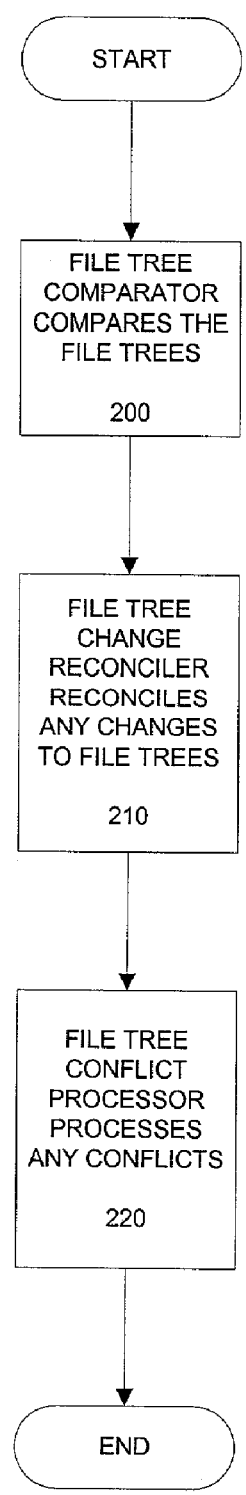
FIG. 2 is a flowchart of a system which processes file trees.

A file tree conflict processor operates at the end of a system which processes file trees. The system is shown in FIG. 2. At block 200 the file tree comparator compares the file trees. At block 210, the file tree change reconciler reconciles any changes to the file trees. At block 220, the file tree conflict processor processes any conflicts that may arise during the reconciliation operation above.

Figure 3:
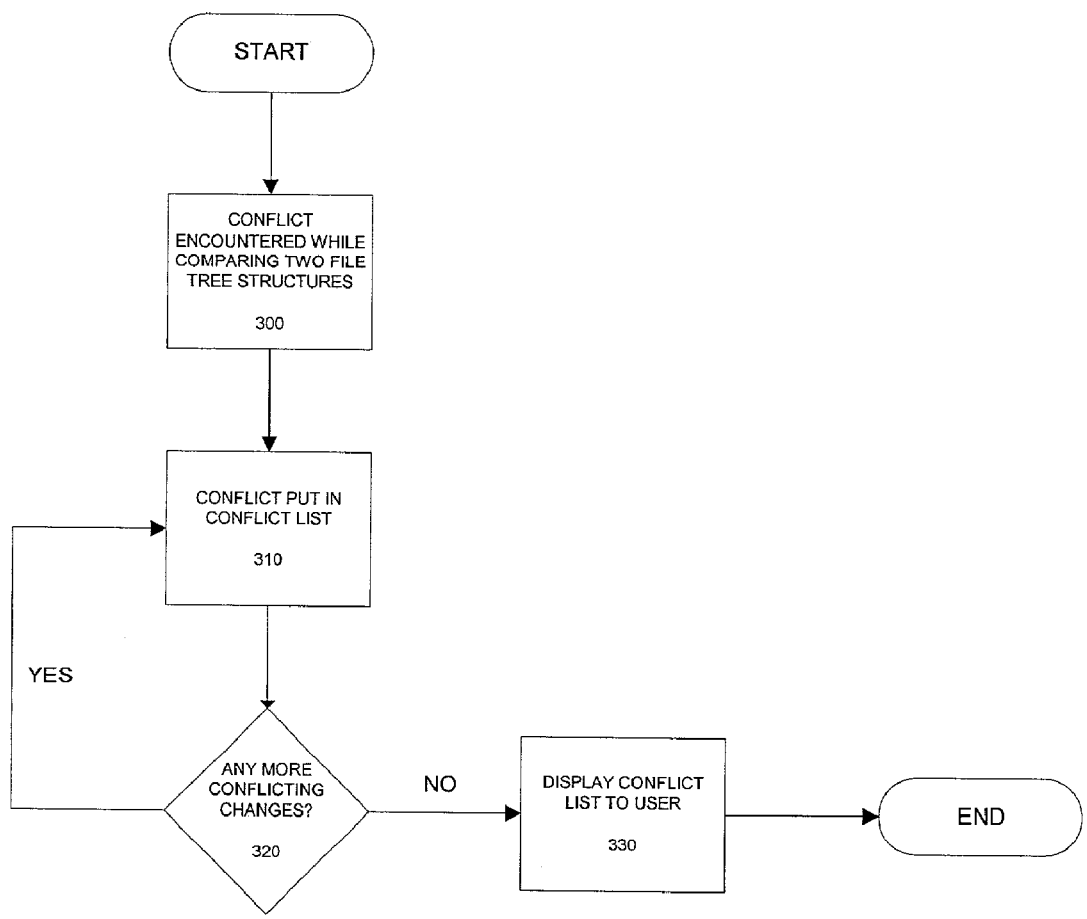
FIG. 3 is a flowchart of one embodiment of the present invention.

One embodiment of the present invention is shown in FIG. 3. It shows in more detail the process that might occur at block 220 in FIG. 2 above. At block 300, a conflict is encountered while comparing two file tree structures. At block 310, the conflict is put in a conflict list. At block 320, the processor checks for any more conflicting changes in the two file trees. If there are more conflicts found, they are put in the list (block 320), else at block 330 the conflict list is displayed to the user.

Figure 11:
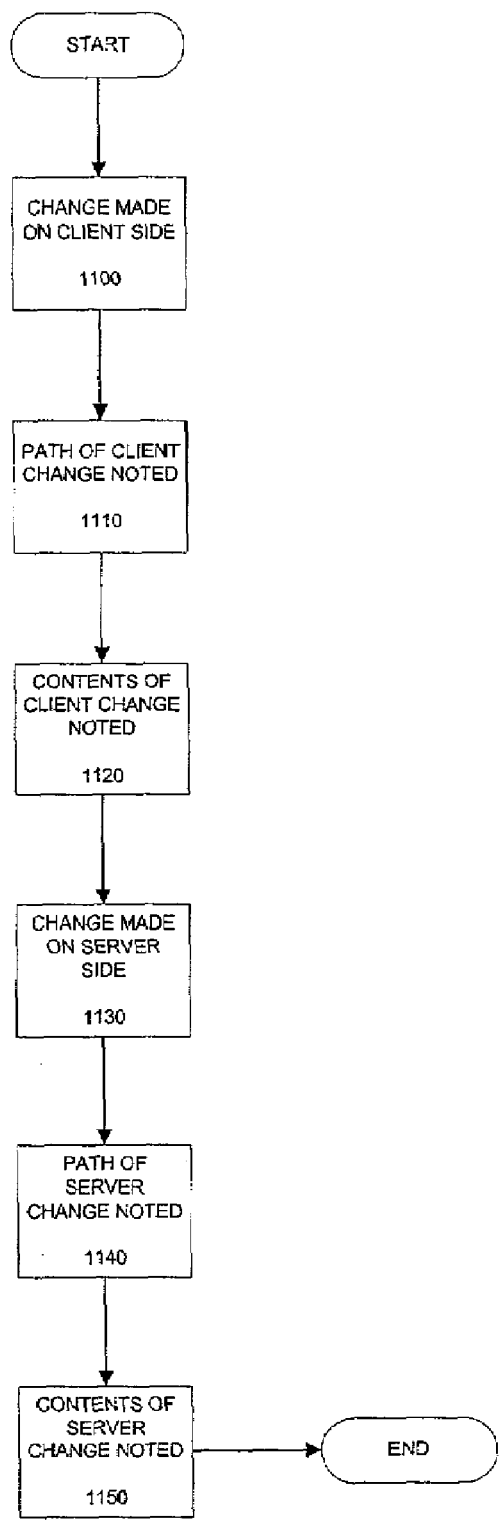
FIG. 11 is a flowchart illustrating a conflict encountered by a file tree conflict processor.

FIG. 11 is a flowchart that illustrates an example of a conflict that may be encountered by the file tree conflict processor. At block 1100, a change is made on the client side, for example a replace operation. At block 1110, this change is made in a directory, for example Status.html, and at block 1120, the file or path where the change is made is noted, for example contents: <!doctype html public "-//w3c//dtd html [. . ]. Similarly, a change can be made on the server side. It must be noted here that the change on the serer side is made independent of the change on the client side. In other words, the server side change can be made simultaneously as the client side change, or can be made at a different time.

A server side change is seen at block 1130. This change may be for example a replace operation. At block 1140, this change is made in a directory, for example Status.html, and at block 1150, the file or path where the change is made is noted, for example contents: <!doctype html semi-private "-//w3c//dtd html [. . ]. The path of changes made on the client and server sides are different, and after a synchronization process of the client and the server, the file tree conflict processor encounters this difference. The resolution of the difference is explained in other embodiments of the invention below.

An example of a server's version of its "briefcase index tree" presuming that it resolves the conflict mentioned above in favor of the server after a synchronization operation may look like:

Conflicts(1):
Conflict 1:
   Client changes: 1
   ContentChange: Replace
   path: Status.html
   contents: <!doctype html public "-//w3c//dtd html [. . ]
   Server changes: 1
   ContentChange: Replace
   path: Status.html
   contents: <!doctype html semi-private "-//w3c//dtd html [. . ]

We notice in the example above that the server has not applied the conflicting client change as its stored signature, but has instead reflected the content as changed by the server.

The objects to check for the conflict mentioned above may look like:
   MappedContentIndex
   path=/home/username/master/
   ContentIndex
   children(1):
   ContentIndex
   path=Status.html
   content signature: OAhokpmqGRL01a1cS.

Figure 4:
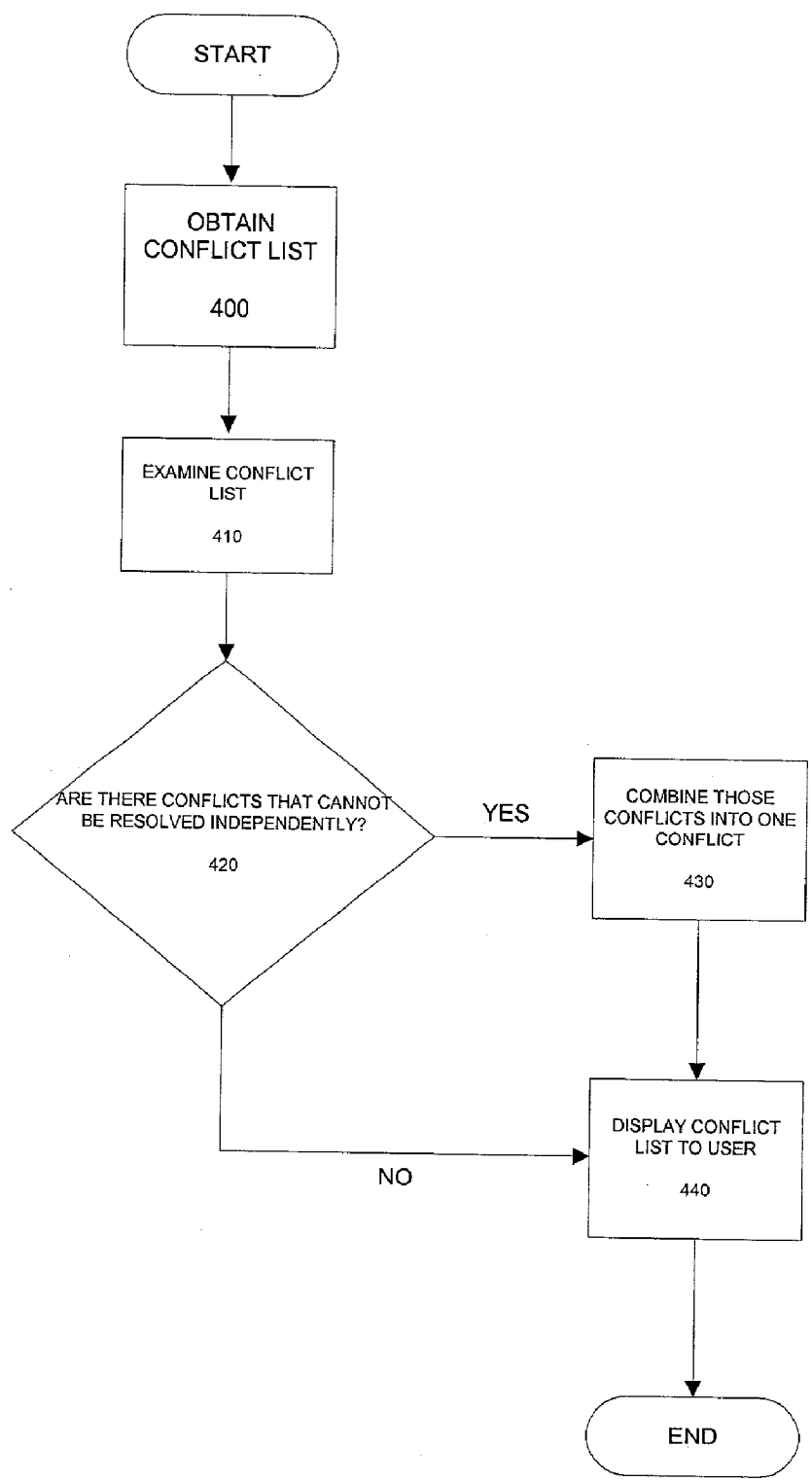
FIG. 4 is a flowchart of another embodiment of the present invention.

Another embodiment of the present invention is shown in FIG. 4. At block 400, the conflict processor obtains a conflict list. At block 410, the conflict processor examines the conflicts in the conflict list. At block 420, the conflict processor checks the conflict list if there are more than one conflict that cannot be resolved independently, and can be combined to form a single conflict. If there are conflicts that cannot be resolved independently and can be combined to form a single conflict, the conflict processor combines those conflicts into a single conflict at block 430 before displaying the list to the user at block 440. If on the other hand, all conflicts in the conflict list can be resolved independently or there are no conflicts that can be combined to form a single conflict, the conflict processor displays the list to the user at block 440.

Figure 5:
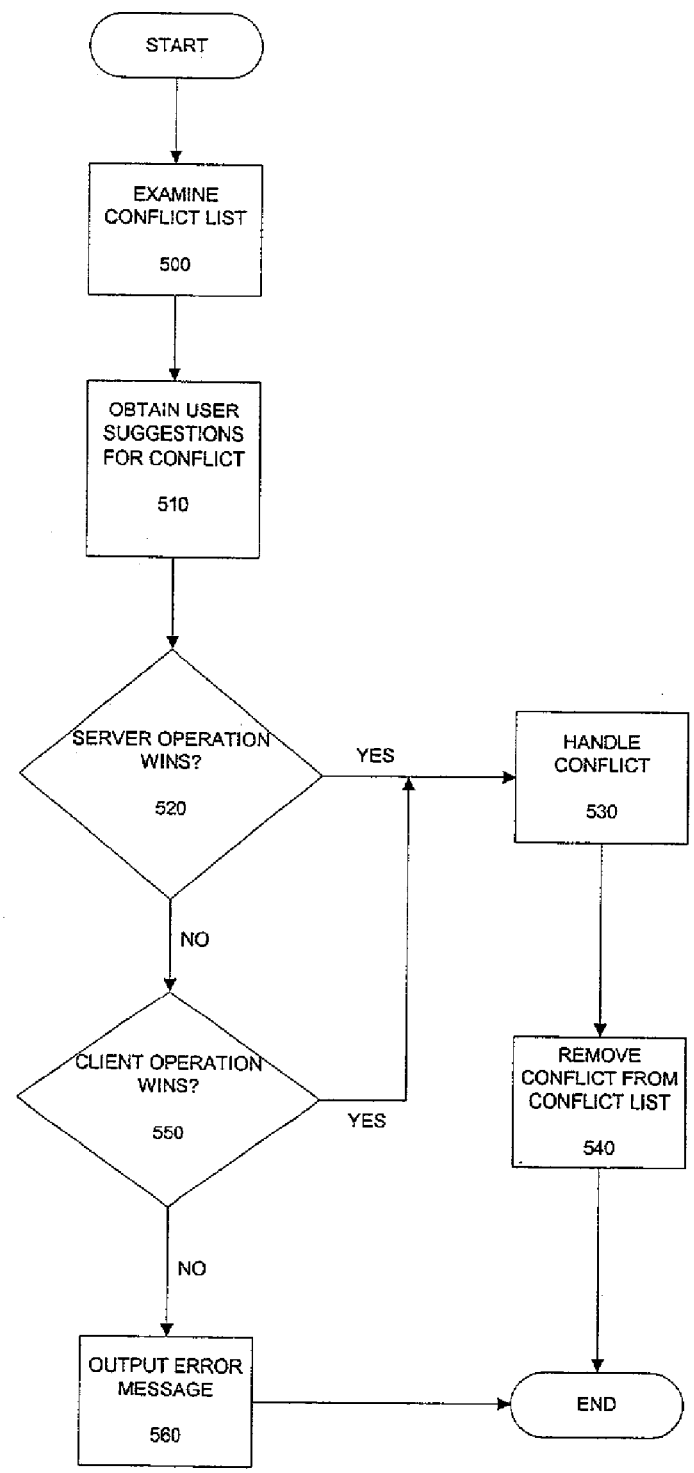
FIG. 5 is a flowchart where a conflict is removed from the conflict list once it is resolved by the conflict processor.

FIG. 5 shows another embodiment of the present invention where a conflict is removed from the conflict list once it is resolved by the conflict processor. At block 500, the conflict list is examined by the conflict processor. At block 510, the conflict processor obtains user suggestions for the conflict in the conflict list. At block 520, the conflict processor checks to see if the winning operation is a server operation. If it is, then at block 530 the conflict is handled. At block 540, the conflict is removed from the conflict list. If at block 520, the wining operation is not a server operation, then at block 550 it checks to see if the winning operation is a client operation. If the operation is not a client operation, then at block 560, it submits an error message to the user. If on the other hand, block 550 is a client operation, then the processor handles the conflict at block 530 before removing the conflict from the conflict list at block 540.

Figure 6:
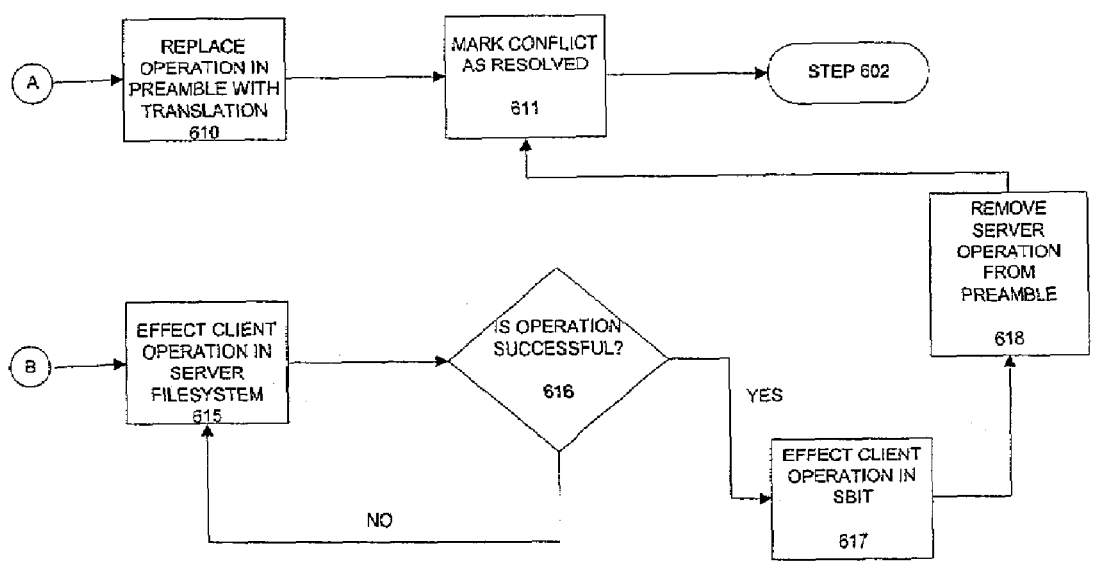
FIG. 6 is a flowchart of another embodiment of the present invention.

FIG. 6 shows another embodiment of the present invention where the winning operations, based on the choice made by the user, are applied to the file tree which has the conflicts. At block 600, the first conflict in the conflict list is examined by the conflict processor. At block 601, the processor checks to see if the conflict has a user suggested resolution. If the conflict is not marked by a user suggestion, then at block 602 the processor checks for the next conflict in the conflict list. At block 602, if there is another conflict in the conflict list, it is examined at block 603 before going back to block 601. On the other hand, if at block 602 there is no more conflicts in the conflict list, then the processor checks at block 604 if there are any unresolved conflicts in the conflict list. If there are unresolved conflicts in the conflict list, then at block 605 the conflict processor waits for a valid user suggestion for the conflicts.

If block 601 has a user suggested resolution, the conflict processor checks at block 607 to see if the server operations should win. If the server operations are the winners of the conflict, then at block 608 the operations are translated back up the conflict list across all previous server operations. At block 609, the operations are translated down the conflict list across all client operations. At block 610, the operation is replaced in the preamble along with the translation. At block 611 the conflict is marked as resolved, and the conflict processor goes back to block 602 to check for another conflict in the conflict list.

If at block 607 the server operations do not win, then the processor checks at block 612 if the client operations should win. If the client operations are the winners of the conflict, then at block 613 the conflicts are translated back up the conflict list across all previous client operations. At block 614, the operations are translated down the conflict list across all server operations. At block 615, the client operation is effected in the server filesystem. At block 616, the conflict processor checks if the operation is successful. If it is not successful, then the conflict processor goes back to block 615. On the other hand, if the operation is a success, then at block 617 the client operation is effected in the s-bit. At block 618 the server operation is removed from the preamble, and at block 611 the conflict is marked as resolved before the conflict processor goes to fetch the next conflict at block 602. If the block 612 the client operations do not win, then the conflict processor goes to block 605 and awaits a valid user suggestion for the conflict.

Figure 7:
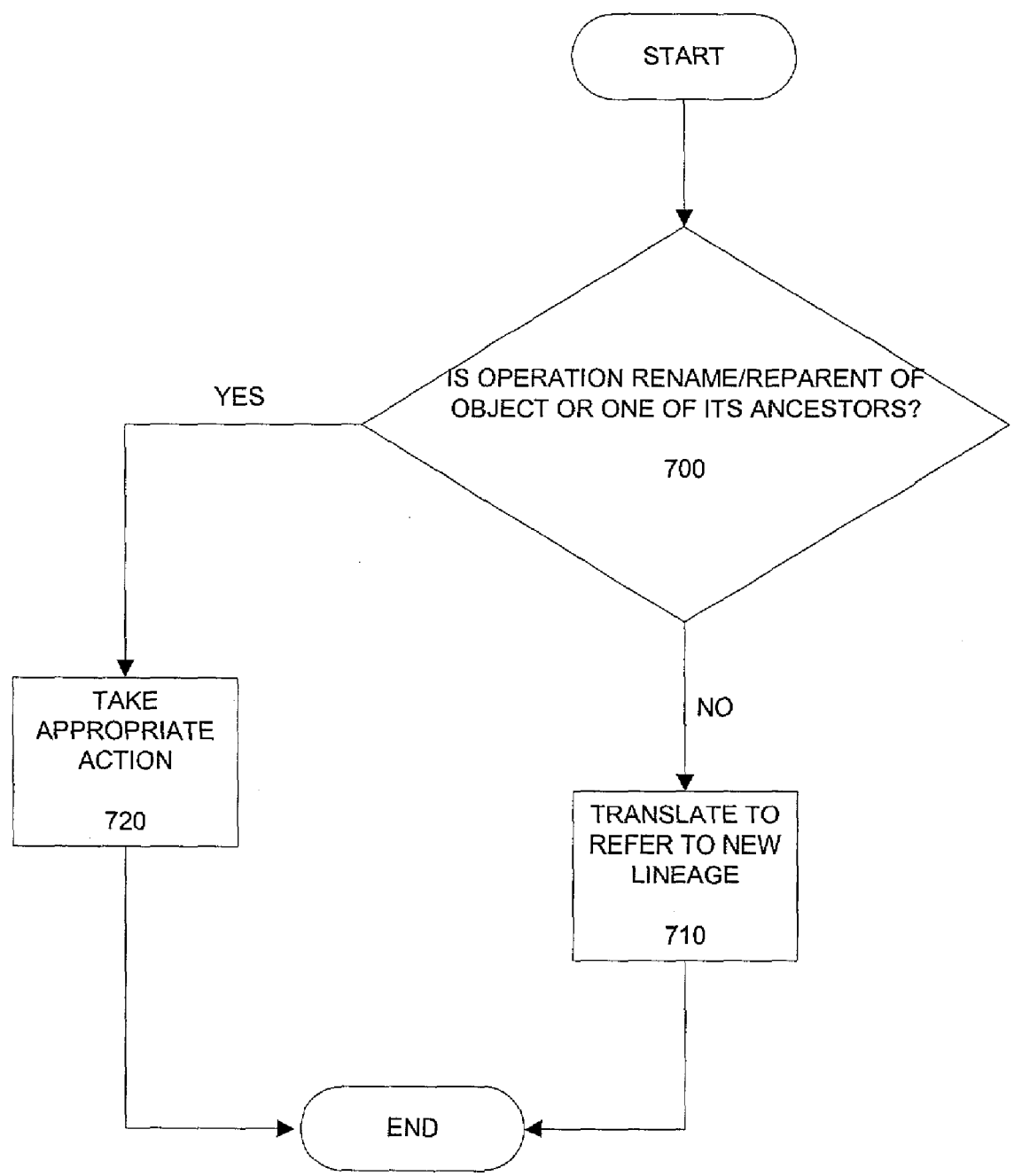
FIG. 7 is a flowchart of another embodiment of the present invention.

One example of translation here means that if the crossed operations are a rename or a reparent of the object of the winning operations, or of one of that object's ancestors in the tree, then the winning operations are translated to refer to the object using its new lineage. This is illustrated in FIG. 7, where at block 700, the conflict processor checks to see if the crossed operations are a rename or a reparent of the object of the winning operations, or of one of that object's ancestors in the tree. If they are, then at block 710, the winning operations are translated to refer to the object using its new lineage. If at block 700, the crossed operations are not a rename or a reparent of the object of the winning operations, or of one of that object's ancestors in the tree, then it takes action appropriate to the translation at block 720.

Figure 8:
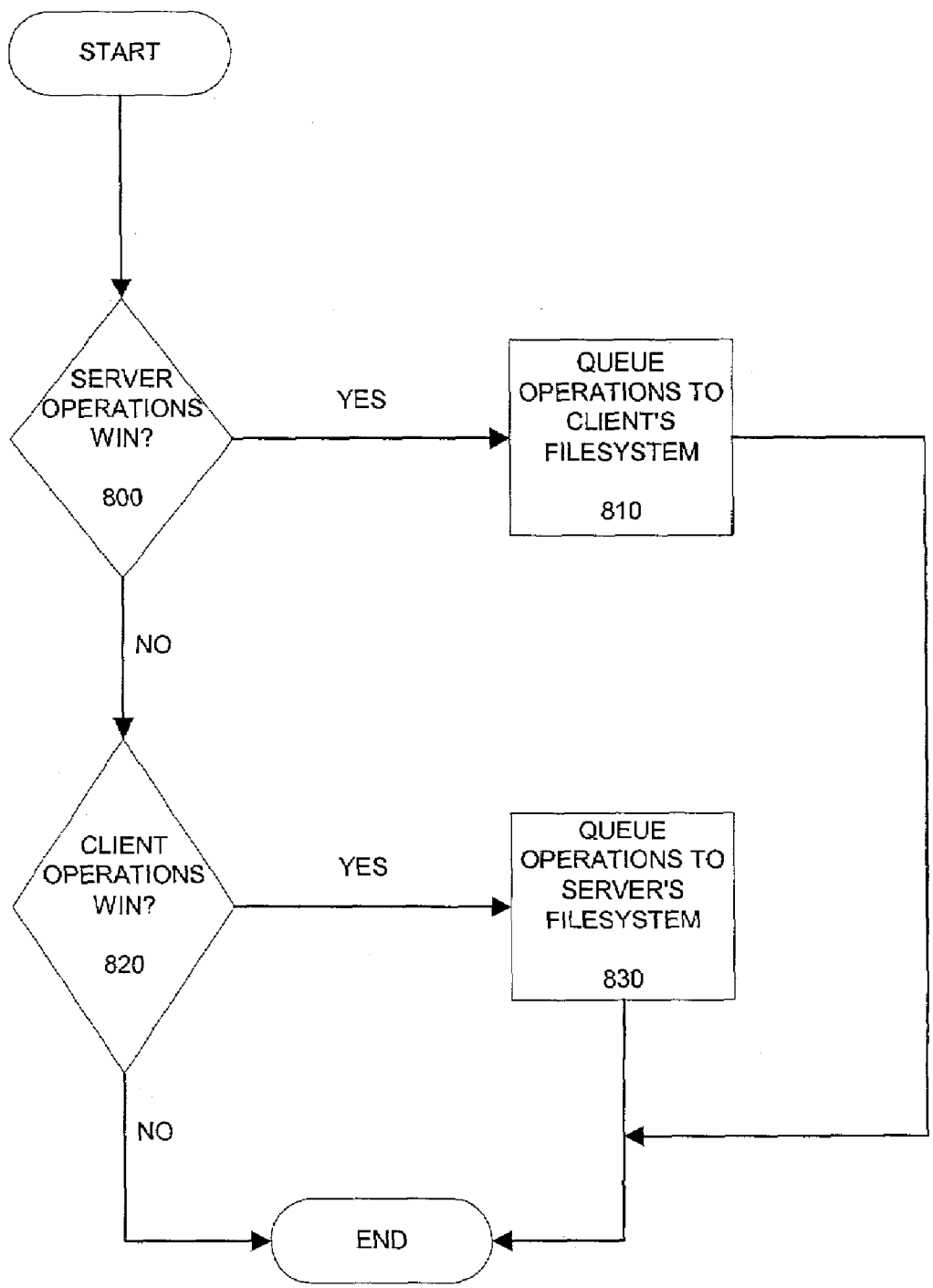
FIG. 8 is a flowchart of another embodiment of the present invention.

Likewise, translations of winning server operations are queued for transmission to the client's filesystem just like the translations of winning client operations are queued for transmission to the server's filesystem. This is seen in FIG. 8, where at block 800, if the translations of the winning operations are server operations, then at block 810 they are queued for transmission to the client's filesystem. If at block 800, the translations of the winning operations are not server operations, then the conflict processor checks to see, at block 820, if the translations of the winning operations are client operations. If they are, then at block 830 the client operations are queued for transmission to the server's filesystem.

Embodiment of a Computer Execution Environment

Figure 9:
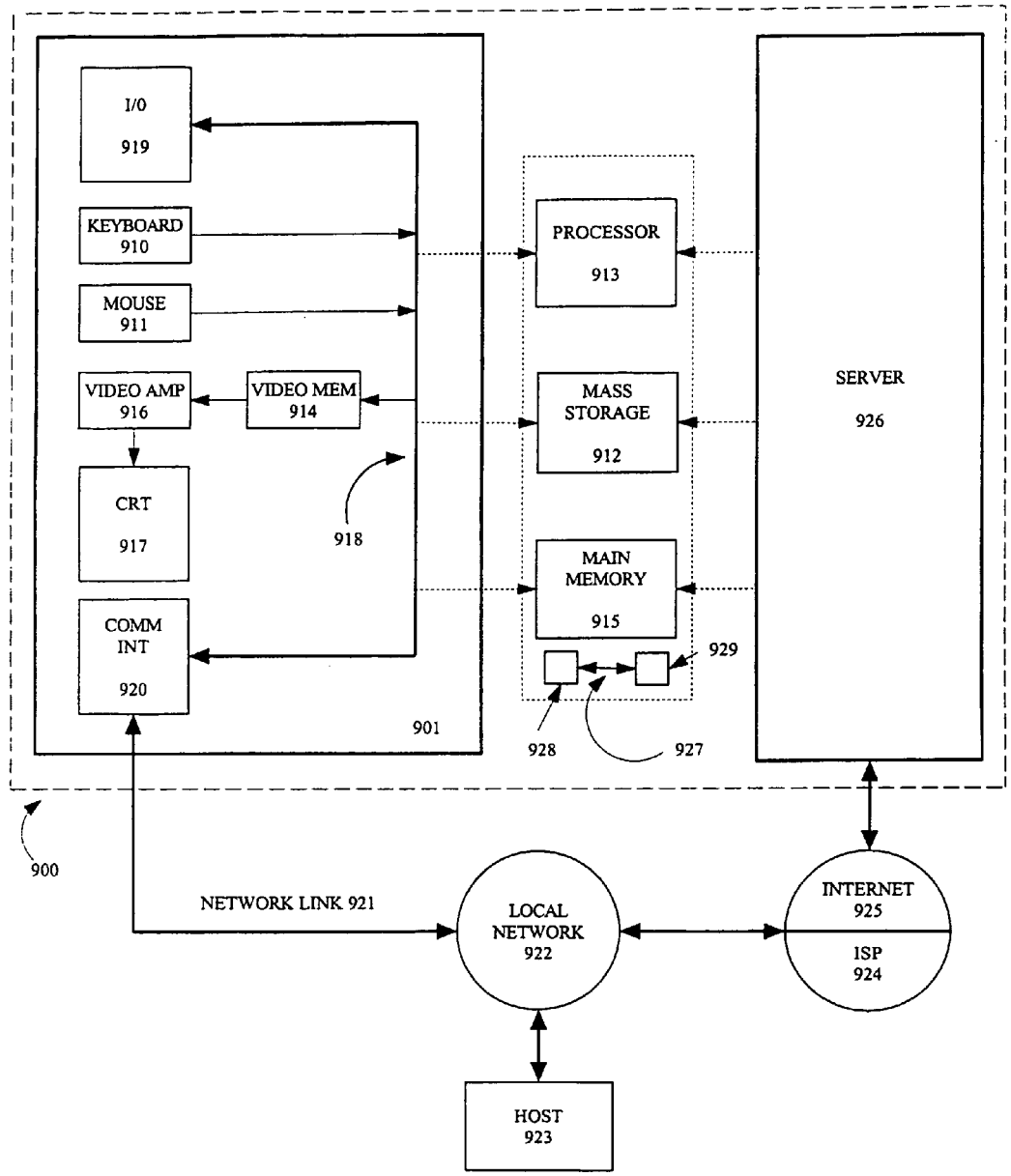
FIG. 9 is an illustration of an embodiment of a computer execution environment.

An embodiment of the invention can be implemented as computer software in the form of computer readable code executed in a desktop general purpose computing environment such as environment 900 illustrated in FIG. 9, or in the form of bytecode class files running in such an environment. A keyboard 910 and mouse 911 are coupled to a bi-directional system bus 918. The keyboard and mouse are for introducing user input to a computer 901 and communicating that user input to processor 913.

Computer 901 may also include a communication interface 920 coupled to bus 918. Communication interface 920 provides a two-way data communication coupling via a network link 921 to a local network 922. For example, if communication interface 920 is an integrated services digital network (ISDN) card or a modem, communication interface 920 provides a data communication connection to the corresponding type of telephone line, which comprises part of network link 921. If communication interface 920 is a local area network (LAN) card, communication interface 920 provides a data communication connection via network link 921 to a compatible LAN. Wireless links are also possible. In any such implementation, communication interface 920 sends and receives electrical, electromagnetic or optical signals, which carry digital data streams representing various types of information.

Network link 921 typically provides data communication through one or more networks to other data devices. For example, network link 921 may provide a connection through local network 922 to local server computer 923 or to data equipment operated by ISP 924. ISP 924 in turn provides data communication services through the world wide packet data communication network now commonly referred to as the "Internet" 925. Local network 922 and Internet 925 both use electrical, electromagnetic or optical signals, which carry digital data streams. The signals through the various networks and the signals on network link 921 and through communication interface 920, which carry the digital data to and from computer 900, are exemplary forms of carrier waves transporting the information.

Processor 913 may reside wholly on client computer 901 or wholly on server 926 or processor 913 may have its computational power distributed between computer 901 and server 926. In the case where processor 913 resides wholly on server 926, the results of the computations performed by processor 913 are transmitted to computer 901 via Internet 925, Internet Service Provider (ISP) 924, local network 922 and communication interface 920. In this way, computer 901 is able to display the results of the computation to a user in the form of output. Other suitable input devices may be used in addition to, or in place of, the mouse 901 and keyboard 900. I/O (input/output) unit 919 coupled to bi-directional system bus 908 represents such I/O elements as a printer, A/V (audio/video) I/O, etc.

Computer 901 includes a video memory 914, main memory 915 and mass storage 912, all coupled to bi-directional system bus 918 along with keyboard 910, mouse 911 and processor 913, and file tree conflict processor 927 which reconciles two synchronized tree of folders 928, which is a client file tree index, and 929, which is a server file index. The two synchronized tree folders 928 and 929 reside on a client and server respectively.

As with processor 913, in various computing environments, main memory 915 and mass storage 912, can reside wholly on server 926 or computer 901, or they may be distributed between the two. Examples of systems where processor 913, main memory 915, and mass storage 912 are distributed between computer 901 and server 926 include the thin-client computing architecture developed by Sun Microsystems, Inc., the palm pilot computing device, Internet ready cellular phones, and other Internet computing devices.

The mass storage 912 may include both fixed and removable media, such as magnetic, optical or magnetic optical storage systems or any other available mass storage technology. Bus 918 may contain, for example, thirty-two address lines for addressing video memory 914 or main memory 915. The system bus 918 also includes, for example, a 32-bit data bus for transferring data between and among the components, such as processor 913, main memory 915, video memory 914, and mass storage 912. Alternatively, multiplex data/address lines may be used instead of separate data and address lines.

In one embodiment of the invention, the processor 913 is a microprocessor manufactured by Motorola, such as the 680X0 processor or a microprocessor manufactured by Intel, such as the 80X86, or Pentium processor, or a SPARC microprocessor from Sun Microsystems, Inc. However, any other suitable microprocessor or microcomputer may be utilized. Main memory 915 is comprised of dynamic random access memory (DRAM). Video memory 914 is a dual-ported video random access memory. One port of the video memory 914 is coupled to video amplifier 916. The video amplifier 916 is used to drive the cathode ray tube (CRT) raster monitor 917. Video amplifier 916 is well known in the art and may be implemented by any suitable apparatus. This circuitry converts pixel data stored in video memory 914 to a raster signal suitable for use by monitor 917. Monitor 917 is a type of monitor suitable for displaying graphic images.

Computer 901 can send messages and receive data, including program code, through the network(s), network link 921, and communication interface 920. In the Internet example, remote server computer 926 might transmit a requested code for an application program through Internet 925, ISP 924, local network 922 and communication interface 920. The received code may be executed by processor 913 as it is received, and/or stored in mass storage 912, or other non-volatile storage for later execution. In this manner, computer 900 may obtain application code in the form of a carrier wave. Alternatively, remote server computer 926 may execute applications using processor 913, and utilize mass storage 912, and/or video memory 915. The results of the execution at server 926 are then transmitted through Internet 925, ISP 924, local network 922, and communication interface 920. In this example, computer 901 performs only input and output functions.

Application code may be embodied in any form of computer program product. A computer program product comprises a medium configured to store or transport computer readable code, or in which computer readable code may be embedded. Some examples of computer program products are CD-ROM disks, ROM cards, floppy disks, magnetic tapes, computer hard drives, servers on a network, and carrier waves.

The computer systems described above are for purposes of example only. An embodiment of the invention may be implemented in any type of computer system or programming or processing environment.

Figure 10:
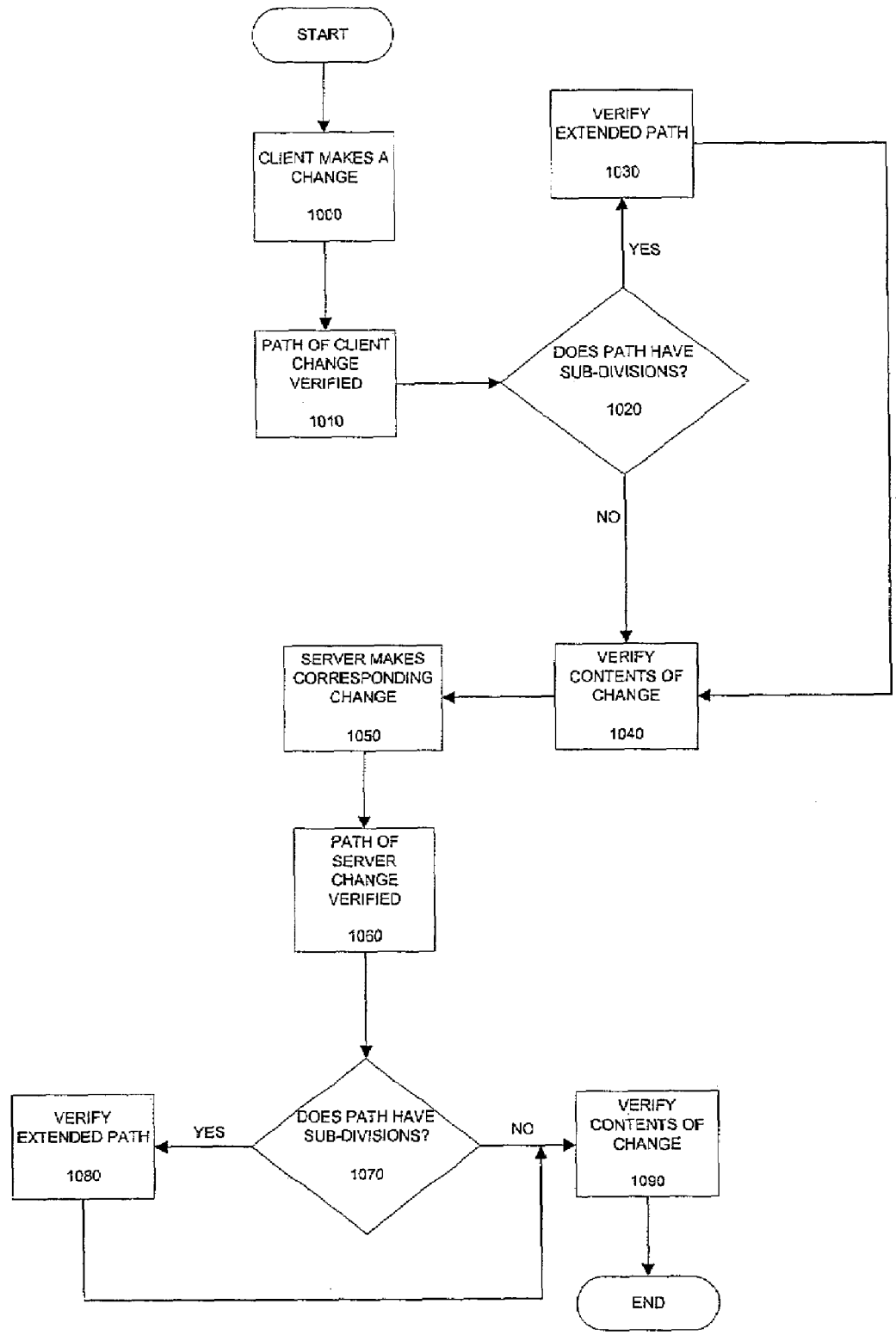
FIG. 10 is a flowchart illustrating an initial synchronization between a client and a server.

FIG. 10 illustrates an example of an initial synchronization in which a client starts with a file, for example, "Status.html" and a server starts with a file, for example, "PseudoRegistry.java" inside a folder, for example, "src". At block 1000, a client makes a change, for example to add contents to file Status.html. At block 1010, the path of the client change is verified, for example Status.html. At block 1020, a check is made to verify if the path has any sub-divisions. In the example, the client makes addition to a file, which lies in the root directory of the client, so there is no further sub-divisions. At block 1030, if the path has sub-divisions, then the extended path of the client change is verified before going to block 1040, else at block 1040 the contents of the change are verified, for example <!doctype html public "-//w3c//dtd html [. . ]>.

Next at block 1050, a server makes the corresponding changes based on the client changes, for example to add contents to src. At block 1060, the path of the server change is verified, for example src. At block 1070, a check is made to verify if the path has any sub-divisions. In the example src is a directory that contains file PseudoRegistry.java where the additions have to be made. At block 1080, if the path has sub-divisions, for example src/PseudoRegistry.java, then the extended path of the server change is verified before going to block 1090, else at block 1090 the contents of the change are verified, for example <package com.sun.PortalSync-Server;impor [. . ]>.

An example of a client's version of its "briefcase index tree" that is used to detect subsequent changes on its side after a synchronization operation described above may look like:

Objects to check for changes(1):
    MappedContentIndex
    path=/tmp/mirror/
    ContentIndex
    children(2):
    ContentIndex
    path=Status.html
    content signature: OAhokamqGRL01a1cS
    MappedContentIndex
    path=src
    content signature: rXARIRMIcOQmcxo4n6
    ContentIndex
    children(1):
    ContentIndex
    path=src/PseudoRegistry.java
    content signature: snMGfFSnaO1gqZV It should be noted here that while /tmp/mirror/ is a container for objects that are in the partnership, the container itself is not in the partnership. In other words, if the container gets renamed, then that change is not propagated to the other side.

Since there are no conflicts, the server tree is identical to the client's tree, except for the path of the synchronized folder. An example of a server's version of its "briefcase index tree" as a result of subsequent changes on its side after a synchronization operation described above may look like:

Objects to check for changes(1):
    MappedContentIndex
    path=/home/username/directoryname/ (for example, /home/john/master/)
    ContentIndex
    children(2):
    ContentIndex
    path=Status.html
    content signature: OAhokamqGRL01a1cS
    MappedContentIndex
    path=src
    content signature: rXARIRMIcOQmcxo4n6
    ContentIndex
    children(1):
    ContentIndex
    path=src/PseudoRegistry.java
    content signature: snMGfFSnaO1gqZV There is another kind of synchronization report where only the changes are sent, not a full census of files/folders as in the synchronization process seen above. For example, if a client edits the Status.html file, while a server deletes the PseudoRegistry.java file, then the client's version of its "briefcase index tree" that is used to detect subsequent changes on its side after a synchronization operation described above may look like:

Objects to check for changes(1):
    MappedContentIndex
    path=/tmp/mirror/
    ContentIndex
    children(2):
    ContentIndex
    path=Status.html
    Contents(142)
    Content signature: U713Jns2PJGVwZ8R
    MappedContentIndex
    path=src
    ContentIndex
    Content signature: 0OwsnMGfFSnaO1gqZ Since there are no conflicts, a server's version of its "briefcase index tree" that is used to detect subsequent changes on its side after a synchronization operation described above is similar to a client's version of its "briefcase index tree" except for the path of the synchronized folder, and may look like:

Objects to check for changes(1):
    MappedContentIndex
    path=/home/username/directoryname/ (for example, /home/john/master/)
    ContentIndex
    children(2):
    ContentIndex
    path=Status.html
    Contents(1142)
    Content signature: U713Jns2PJGVwZ8R
    MappedContentIndex
    path=src
    ContentIndex
    Content signature: 0OwsDMGfFSnaO1gqZ Thus, a file tree conflict processor is described in conjunction with one or more specific embodiments. The embodiments of the present invention are defined by the following claims and their full scope of equivalents.

We claim:

1. A computer-implemented method for processing conflicts in a first and second file tree comprising:
presenting one or more conflicts to a user;
presenting more than one unresolved independent conflicts as a single conflict to said user, wherein said more than one unresolved independent conflicts are file tree conflicts determined from a comparison of the first and second file trees;
obtaining input from said user; and
handling said one or more conflicts and said single conflict based on said input, wherein one or more winning conflicts are applied to a file tree with which they were in conflict, and wherein
if said winning conflicts are server operations, said server operations are translated back up a conflict list across previous server operations, and then down a conflict list across client operations, wherein the translation is one of a rename or a reparent of an object of said winning operation and said winning operation is changed to refer to said object using its new lineage, and
if said winning conflicts are client operations, said client operations are translated back up a conflict list across previous client operations, and then down the conflict list across server operations, wherein the translation is one of a rename or a reparent of an object of said winning operation and said winning operation is changed to refer to said object using its new lineage.

2. The method of claim 1 wherein said winning server operations are en-queued for transmission to the client.

3. The method of claim 1 wherein said winning client operations are applied against said server's filesystem.

4. An article of manufacture comprising:
a computer storage medium having computer readable program code embodied therein for processing conflicts in a first and second file tree, said computer readable program code in said article of manufacture comprising:
computer readable program code configured to cause said computer to present one or more conflicts to a user;
computer readable program code configured to cause said computer to present more than one unresolved independent conflicts as a single conflict to said user, wherein said more than one unresolved independent conflicts are file tree conflicts determined from a comparison of the first and second file trees;
computer readable program code configured to cause said computer to obtain input from said user; and
computer readable program code configured to cause said computer to handle said one or more conflicts and said single conflict based on said input, wherein one or more winning conflicts are applied to a file tree with which they were in conflict, and wherein
if said winning conflicts are server operations, said server operations are translated back up a conflict list across previous server operations, and then down a conflict list across client operations, wherein the translation is one of a rename or a reparent of an object of said winning operation and said winning operation is changed to refer to said object using its new lineage, and
if said winning conflicts are client operations, said client operations are translated back up a conflict list across previous client operations, and then down the conflict list across server operations, wherein the translation is one of a rename or a reparent of an object of said winning operation and said winning operation is changed to refer to said object using its new lineage.

5. The article of manufacture of claim 4 wherein said winning server operations are en-queued for transmission to the client.

6. The article of manufacture of claim 4 wherein said winning client operations are applied against said server's filesystem.

7. A computer program product comprising:
a computer storage medium having computer readable program code embodied therein configured to process conflicts in a first and second file tree, said computer program product comprising:
computer readable code configured therein to cause a computer to present one or more conflicts to a user;
computer readable code configured therein to cause a computer to present more than one unresolved independent conflicts as a single conflict to said user, wherein said more than one unresolved independent conflicts are file tree conflicts determined from a comparison of the first and second file trees;
computer readable code configured therein to cause a computer to obtain input from said user; and
computer readable code configured therein to cause a computer to handle said one or more conflicts and said single conflict based on said input, wherein one or more winning conflicts are applied to a file tree with which they were in conflict, and wherein
if said winning conflicts are server operations, said server operations are translated back up a conflict list across previous server operations, and then down a conflict list across client operations, wherein the translation is one of a rename or a reparent of an object of said winning operation and said winning operation is changed to refer to said object using its new lineage, and
if said winning conflicts are client operations, said client operations are translated back up a conflict list across previous client operations, and then down the conflict list across server operations, wherein the translation is one of a rename or a reparent of an object of said winning operation and said winning operation is changed to refer to said object using its new lineage.

8. The computer program product of claim 7 wherein said winning server operations are en-queued for transmission to the client.

9. The computer program product of claim 7 wherein said winning client operations are applied against said server's filesystem.

* * * * *